F. ANDREWS.
HORSE COLLAR.
APPLICATION FILED MAY 31, 1912.
1,062,684.
Patented May 27, 1913.
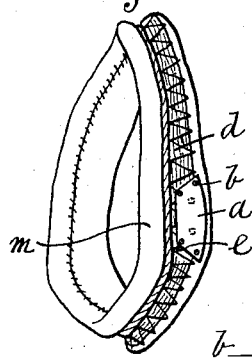
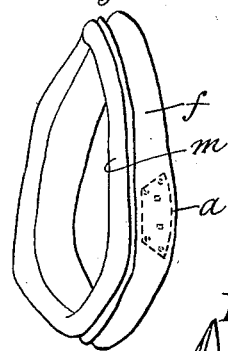
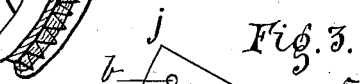
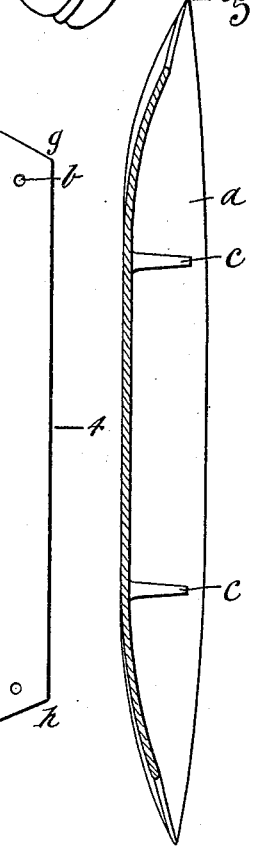
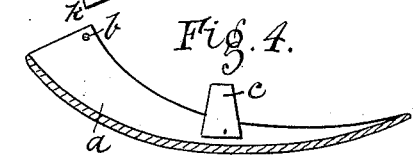
Witnesses.
E W Bayly
W.E.P.Bayly
Inventor.
Frederick Andrews,
Per John Pitt Bayly,
attorney.
COLUMBIA PLANOGRAPH CO., WASHINGTON, D. C.

UNITED STATES PATENT OFFICE.

FREDERICK ANDREWS, OF MERCER, NEW ZEALAND.

HORSE-COLLAR.

1,062,684.  Specification of Letters Patent.  Patented May 27, 1913.

Application filed May 31, 1912. Serial No. 700,776.

*To all whom it may concern:*

Be it known that I, FREDERICK ANDREWS, a subject of the King of Great Britain, residing at Mercer, Auckland, New Zealand, farmer, have invented new and useful Improvements Relating to Horse-Collars, of which the following is a specification.

This invention relates to improved means for stiffening horse collars for the purpose of preventing " sore " shoulders. Sore shoulders are caused by collars which have been worn for some time, the collar being pressed out of shape by the pressure of the draft hook. It is known that a new collar is not so liable to give sore shoulders as an old one. It would appear therefore that the stuffing of the collar becomes compressed or hardened locally, and the pressure of the draft hook is transmitted directly to the shoulder muscles by a hard medium instead of by a resilient padding. Attempts have previously been made to overcome these objections, and these attempts have been made on two main lines first, it has been suggested to render the entire collar stiff by means of a metal lining. This method interferes with the general elasticity of the collar and renders it hard and heavy, while it entails the use of a special collar. The second order of attempts consists in providing local stiffenings. This method when used with an ordinary collar is not open to either of these objections, and the present invention is directed toward a novel form of local stiffening by means of which both the longitudinal and side pressing forces are taken up, and transmitted to the shoulders of the horse or other animal, as a single force—whereby the nipping action, which I have found produces such sore shoulders is prevented. This single force might be termed the resultant force acting through the convex padding, it being resultant of the uniform pressure into which the plate transmutes the dragging and side pressing forces.

Local stiffenings, as hitherto known have been associated with the hames, or applied externally in such a manner that the leverage of the draft hook pressure has been increased. The novel method of operation according to the present invention resides in providing a stiffening which does not harden the collar, nor add materially to its weight, while at the same time it takes up both the longitudinal and side forces and transmits these through the ordinary packing to the shoulders of the animal without increasing of these draft hook pressures.

I have discovered that the localized hardening of the padding or stuffing of a horse collar may be completely prevented and the life of the collar prolonged by employing a load distributing shield located preferably within, but independent of, the leather after wale of the collar in the neighborhood of the draft hook. This shield should be fixed to the collar body or packing and I find this construction avoids all cutting of the after wale by the shield. It is not necessary to fix the leather to the shield or the shield to the leather, and in fact the results obtained by fixing the shield to the collar body or packing show that the load distribution on the horse's shoulders is most favorable with this construction, while the life of the collar is considerably lengthened.

The invention is illustrated in one convenient form in the accompanying drawing in which:—

Figure 1, is a perspective view of a collar without the cover for the after wale fixed on and with my shield in place on the padding; Fig. 2, shows the collar with the leather cover and the shield dotted in place; Fig. 3, is a plan view; Fig. 4, is a section of the shield on the line 4—4, and Fig. 5, is a section on the line 5—5 of Fig. 3.

According to the form shown, the shield $d$, is of metal such as aluminium bronze and is of the shape shown in Figs. 3–5, so as to conform to the shape of the outside of the collar in the neighborhood of the draft hooks. This shield plate is conveniently provided with four holes $b$, and it may also be provided with projections $c$, on its concave surface. The holes are for the purpose of tying or lacing the shield on to the padding of the collar forming the collar body in the position shown in Fig. 1. In this figure the usual straw or like padding $d$, is shown and on this padding the shield $a$, is placed with its concave side toward the straw or the like. The plate is then tied in position by means of strings $e$, while the projections $c$, if provided, pass into the packing and prevent displacement. The after wale $f$, is then fixed on in the customary manner. The construction illustrated is the preferable one as the best results are obtained by fixing the shield to the padding before the after wale is fixed.

The shield should be of greater curvature as it approaches the long side so that the shield will lie in proper position to take up the direct back pressure and the side pressure on the collar. In ordinary collars the draft hooks transmit their back pressure directly through the padding while they also exert a side pressure. When an ordinary collar has been in use for a short time these two pressures are applied at different points on the horse's shoulder and are continually changing when the horse is walking. The result is that the horse's shoulders are being continually pinched or chafed between the two forces mentioned. The shield herein described is designed to take up both these forces which, owing to the rigidity of the shield are transformed into an evenly distributed pressure on the shoulder.

The plate should be clear of the fore wale $m$, of the collar so as to permit of the easy fixing of the after wale in the customary manner. The plate $a$, does not necessarily extend under the hames as these are quite rigid enough in themselves and in fact it would be inadvisable to extend the plate under the hames for other reasons than that of convenience in fixing the after wale. Such a construction might possibly interfere with the plate to such an extent that it would render it necessary to fix the shield to the interior of the after wale, a step which is not advisable.

The plate may be of various lengths but I find that a plate having the distance from $g$ to $h$, about 5 inches to $5\frac{1}{2}$ inches and the distance $j$ to $k$, about 7 inches meets the requirements admirably. I do not wish to confine myself to these sizes which of course vary with the sizes of the collar—the sizes given however represent those I at present use on draft horse collars. The distances from $g$ to $j$, and from $h$ to $k$, are about $3\frac{3}{4}$ inches.

It will be understood that the shield may be of any suitable material.

I claim:

1. In combination with a horse or like collar, a metal shield conforming to the outside shape of the collar, and adapted to be fixed to the packing of the body of the collar but independent of the hames and of the covering of the after wale, said shield being located in the neighborhood of the draft hook, and extending over the front and side of the collar inside the after wale, substantially as and for the purpose set forth.

2. A concave shield with its top and bottom ends cut to an angle, having two projections at the back for passing into the packing of the collar, and a number of holes for tying or lacing the shield on to the padding of the collar forming the collar body, substantially as hereinbefore described and illustrated.

FREDERICK ANDREWS.

Witnesses:
O. J. WORTH,
C. P. LIDDON.